(12) United States Patent
Voss

(10) Patent No.: US 11,826,987 B2
(45) Date of Patent: Nov. 28, 2023

(54) LAMINATED GLAZING AND PROCESS

(71) Applicant: Pilkington Group Limited, Nr. Ormskirk Lancashire (GB)

(72) Inventor: Jonathan Peter Voss, Croston Lancashire (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 0 days.

(21) Appl. No.: 17/442,975

(22) PCT Filed: Mar. 26, 2020

(86) PCT No.: PCT/GB2020/050821
§ 371 (c)(1),
(2) Date: Sep. 24, 2021

(87) PCT Pub. No.: WO2020/193986
PCT Pub. Date: Oct. 1, 2020

(65) Prior Publication Data
US 2022/0176681 A1    Jun. 9, 2022

(30) Foreign Application Priority Data

Mar. 26, 2019   (GB) .................................... 1904203

(51) Int. Cl.
*B32B 17/10*   (2006.01)
*B60R 1/00*    (2022.01)
*G02B 27/00*   (2006.01)

(52) U.S. Cl.
CPC .. *B32B 17/10348* (2013.01); *B32B 17/10036* (2013.01); *B32B 17/1088* (2013.01);
(Continued)

(58) Field of Classification Search
CPC ............ B32B 17/10; B60R 1/00; G02B 27/00
(Continued)

(56) References Cited

U.S. PATENT DOCUMENTS

| 5,443,669 A | 8/1995 | Tuenker |
|---|---|---|
| 2002/0039238 A1 | 4/2002 | Chang |

(Continued)

FOREIGN PATENT DOCUMENTS

| CN | 112159082 A | 1/2021 |
|---|---|---|
| CN | 112193031 A | 1/2021 |

(Continued)

OTHER PUBLICATIONS

International Search Report (PCT/ISA/210) and Written Opinion (PCT/ISA/237) dated Jun. 22, 2020, by the European Patent Office as the International Searching Authority for International Application No. PCT/GB2020/050821. (8 pages).

(Continued)

*Primary Examiner* — Tahseen Khan
(74) *Attorney, Agent, or Firm* — BUCHANAN INGERSOLL & ROONEY PC

(57) ABSTRACT

A laminated glazing has a first glass ply having first and second surfaces, a second glass ply having third and fourth surfaces, an obscuration band around at least a portion of the glazing periphery, the obscuration band having a sensor window and comprising first and second obscuration layers, the first obscuration layer adhered to at least a portion of the periphery of the first/second surface and comprising a first sensor window portion having a first sensor window portion optical distortion, the second obscuration layer adhered to at least a portion of the periphery of the third/fourth surface and comprising a second sensor window portion having a second sensor window portion optical distortion. first and second sensor window portion optical distortions are each controlled so the absolute magnitude of the optical distortion of the sensor window is lower than the absolute magnitude of the first and second sensor window optical distortions.

19 Claims, 9 Drawing Sheets

(52) U.S. Cl.
CPC .. *B32B 17/10633* (2013.01); *B32B 17/10651* (2013.01); *B32B 17/10889* (2013.01); *B60R 1/001* (2013.01); *G02B 27/005* (2013.01); *B32B 2307/4026* (2013.01); *B32B 2307/416* (2013.01)

(58) Field of Classification Search
USPC .......................................................... 428/174
See application file for complete search history.

(56) References Cited

U.S. PATENT DOCUMENTS

| | | | |
|---|---|---|---|
| 2004/0208497 | A1 | 10/2004 | Seger et al. |
| 2005/0001901 | A1 | 1/2005 | Ggers et al. |
| 2006/0250711 | A1* | 11/2006 | Noguchi ........... B32B 17/10293 359/900 |
| 2007/0187382 | A1 | 8/2007 | Mauser |
| 2007/0262574 | A1* | 11/2007 | Breed .................. G06V 40/103 382/104 |
| 2008/0284850 | A1 | 11/2008 | Blaesing et al. |
| 2009/0085755 | A1 | 4/2009 | Schafer et al. |
| 2009/0122138 | A1 | 5/2009 | Bischoff et al. |
| 2009/0130395 | A1 | 5/2009 | Lyon et al. |
| 2009/0257141 | A1 | 10/2009 | Yamada et al. |
| 2010/0060077 | A1 | 3/2010 | Paulus et al. |
| 2010/0098917 | A1 | 4/2010 | Lyon |
| 2010/0219173 | A1 | 9/2010 | Gruber |
| 2011/0074643 | A1 | 3/2011 | Baranski |
| 2012/0256798 | A1 | 10/2012 | Paulus et al. |
| 2013/0106993 | A1 | 5/2013 | Schofield et al. |
| 2013/0229522 | A1 | 9/2013 | Schofield et al. |
| 2013/0258436 | A1 | 10/2013 | Podbelski et al. |
| 2014/0293054 | A1 | 10/2014 | Tomescu |
| 2014/0300738 | A1 | 10/2014 | Mueller |
| 2015/0034621 | A1 | 2/2015 | Timmermann et al. |
| 2016/0093944 | A1 | 3/2016 | Kamo |
| 2016/0243796 | A1* | 8/2016 | Mannheim Astete ....................... B32B 17/10651 |
| 2016/0316192 | A1 | 10/2016 | Kishiwada |
| 2017/0015180 | A1 | 1/2017 | Sakamoto et al. |
| 2017/0167872 | A1 | 6/2017 | Schierbeek |
| 2017/0190151 | A1 | 7/2017 | Hamano et al. |
| 2017/0232713 | A1* | 8/2017 | Mannheim Astete ....................... B32B 17/10788 428/172 |
| 2017/0274629 | A1 | 9/2017 | Yajima et al. |
| 2017/0341491 | A1 | 11/2017 | Nakagawa |
| 2018/0037094 | A1 | 2/2018 | Egrand |
| 2018/0118116 | A1 | 5/2018 | Schofield et al. |
| 2018/0152609 | A1 | 5/2018 | Wang et al. |
| 2018/0175491 | A1 | 6/2018 | DeMersseman |
| 2018/0257342 | A1 | 9/2018 | Yano et al. |
| 2018/0305245 | A1 | 10/2018 | Conti et al. |
| 2019/0030865 | A1 | 1/2019 | Aoki et al. |
| 2019/0031116 | A1 | 1/2019 | Bulgajewski et al. |
| 2019/0047379 | A1 | 2/2019 | Meller |
| 2019/0219753 | A1 | 7/2019 | Kaneiwa et al. |
| 2019/0263105 | A1 | 8/2019 | Briquet |
| 2019/0337269 | A1 | 11/2019 | Sartenaer et al. |
| 2020/0254731 | A1 | 8/2020 | Mannheim Astete et al. |
| 2020/0282922 | A1 | 9/2020 | Mannheim Astete et al. |
| 2020/0290318 | A1 | 9/2020 | Mannheim Astete et al. |
| 2020/0290319 | A1 | 9/2020 | Mannheim Astete et al. |
| 2020/0376815 | A1 | 12/2020 | Mannheim Astete et al. |
| 2020/0391577 | A1 | 12/2020 | Bard et al. |
| 2020/0398536 | A1 | 12/2020 | Wohlfeil |
| 2021/0021745 | A1 | 1/2021 | Mannheim Astete et al. |
| 2021/0031597 | A1 | 2/2021 | Sauvinet |
| 2021/0039358 | A1 | 2/2021 | Mannheim Astete et al. |
| 2021/0078299 | A1 | 3/2021 | Keller |
| 2021/0237403 | A1 | 8/2021 | Klein et al. |
| 2021/0237540 | A1 | 8/2021 | Kojima et al. |

FOREIGN PATENT DOCUMENTS

| | | | | |
|---|---|---|---|---|
| CN | 112208310 A | 1/2021 | | |
| DE | 10 2006 022 404 A1 | 11/2007 | | |
| DE | 20 2018 105 625 U1 | 10/2018 | | |
| DE | 202018105625 U1 | 10/2018 | | |
| DE | 20 2019 103 729 U1 | 7/2019 | | |
| DE | 20 2019 106 306 U1 | 11/2019 | | |
| DE | 20 2020 101 267 U1 | 3/2020 | | |
| DE | 20 2020 106 572 U1 | 12/2020 | | |
| EP | 0415020 A1 | 3/1991 | | |
| EP | 1605729 A2 | 12/2005 | | |
| EP | 2 246 219 A1 | 11/2010 | | |
| EP | 2 982 941 A1 | 2/2016 | | |
| EP | 3228455 A1 * | 10/2017 | ....... | B32B 17/10036 |
| EP | 3228455 A1 | 10/2017 | | |
| EP | 3 293 701 A1 | 3/2018 | | |
| FR | 3 063 676 B1 | 5/2021 | | |
| GB | 2 201 782 A | 9/1988 | | |
| JP | 2007-290549 A | 11/2007 | | |
| NL | 1043222 B1 | 10/2020 | | |
| WO | 2005/033772 A1 | 4/2005 | | |
| WO | 2014174310 A1 | 10/2014 | | |
| WO | WO-2014174310 A1 * | 10/2014 | ....... | B32B 17/10036 |
| WO | 2015/186839 A1 | 12/2015 | | |
| WO | 2016/088472 A1 | 6/2016 | | |
| WO | 2017068368 A1 | 4/2017 | | |
| WO | 2017/159452 A1 | 9/2017 | | |
| WO | 2017159452 A1 | 9/2017 | | |
| WO | 2019/137674 A1 | 7/2019 | | |
| WO | 2019147605 A1 | 8/2019 | | |
| WO | WO-2019147605 A1 * | 8/2019 | ............... | B32B 1/00 |
| WO | 2019/166210 A1 | 9/2019 | | |
| WO | 2020/115170 A1 | 6/2020 | | |
| WO | 2020/165232 A1 | 8/2020 | | |
| WO | 2020/187994 A1 | 9/2020 | | |
| WO | 2020/229260 A1 | 11/2020 | | |
| WO | 2021/064035 A1 | 4/2021 | | |
| WO | 2021/110723 A1 | 6/2021 | | |

OTHER PUBLICATIONS

GB Search Report issued in corresponding Patent Application No. GB1904203.5 dated Nov. 15, 2019. (3 pages).

International Preliminary Report on Patentability (Form PCT/IB/373) and the Written Opinion of the International Searching Authority (Form PCT/ISA/237) dated Sep. 28, 2021, by the International Bureau of WIPO in corresponding International Application No. PCT/GB2020/050821. (6 pages).

* cited by examiner

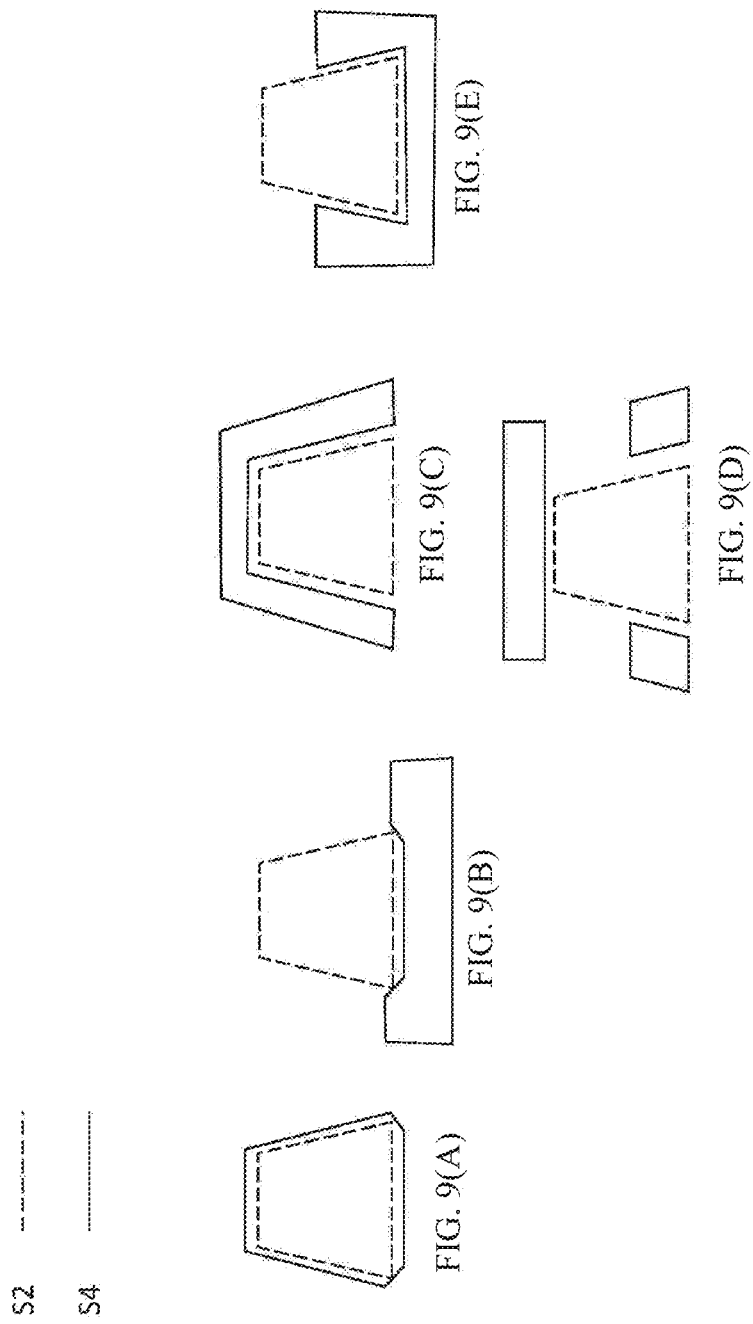

LAMINATED GLAZING AND PROCESS

The present invention relates to laminated glazings, to automotive glazings, and to processes for producing such glazings.

Laminated glazings comprising two sheets of glazing material, normally glass, laminated together by a plastics interlayer (for example polyvinyl butyral, PVB) are useful in architectural and particularly in automotive glazings.

Windscreens and, increasingly other automotive glazings, are generally laminated glazings and may have obscuration bands provided around their periphery. Obscuration bands are often black or very dark in colour and are generally opaque to visible light (and often other wavelengths, for example UV). Obscuration bands serve to hide components on the glazing such as fixings and also to provide UV protection to, for example, adhesives used to fix the glazing in position.

Obscuration bands may be produced using an enamel. Such enamels, once fired, are durable to weathering and abrasion. The obscuration bands may be applied by screen printing an enamel ink on to glass. Enamel inks typically comprise a frit (flux), pigment and liquid component (e.g. oils) to improve the screen-printing properties of the enamel ink. After screen printing, the enamel ink may be cured (e.g. by ultraviolet irradiation) or dried (e.g. by heating to up to about 300° C.) and may then be fired by heating to high temperature to melt the flux and ensure adhesion to the glass surface.

It is common practice to number the surfaces of laminated glazings, starting with the surface facing the exterior of the vehicle or building in which the glazing is installed. Thus, surface 1 is the surface facing the exterior, and is an exposed surface. In a laminate comprising two plies of glazing material, surface 1 is the exterior surface of the outward-facing ply. Surface 2 is the inward-facing surface of the exterior ply, i.e. the surface of the exterior ply which faces towards the interior of the vehicle or building. Surface 2 is not an exposed surface, as it is in contact with, and covered by, the plastics interlayer. Surface 3 is the outward-facing surface of the interior ply, i.e. the surface of the interior ply which faces towards the exterior of the vehicle or building. Similarly to surface 2, surface 3 is not an exposed surface, as it is in contact with, and covered by, the plastics interlayer. Thus, surfaces 2 and 3 are unexposed or covered surfaces. Surface 4 is the interior surface of the inward-facing ply, i.e. an exposed surface facing the interior of the vehicle or building.

In laminated glass, for example windscreens, the obscuration band may be printed on surface 4 or an internal surface of the laminate (e.g. surface 2, the glass/polymer interface internal to the laminate). Glazings with obscuration bands on one glass ply are usually shaped by heating each glass substrate to an elevated temperature after the enamel has been applied to the glass substrate. Printing the obscuration band on an inside surface of a laminate (e.g. surface 2 or surface 3) may reduce perspective distortion that may sometimes occur. WO-A-2017/159452 discloses a laminated glass, with in some embodiments printing on surface 2 and 4 with reduced perspective distortion near an obscuration band.

Often, the enamel will be fired by the heating step. After shaping, optical distortion may arise, associated with the boundary between printed/non-printed areas of the glass. Such optical distortion is sometimes called "burnline", and it tends to extend parallel to the boundary.

There have been attempts to reduce or eliminate burnline by modifying bending process parameters such as temperature profile and/or by designing, building and installing shields on the glass bending tools/moulds.

EP-A-0 415 020 discloses a method of preferentially heating a glass sheet having decorative ceramic enamel borders without adversely affecting the optical quality of the glass. The preferential heating is achieved by using heaters that radiate thermal energy at selected wavelengths that are more readily absorbed by the enamel than the glass so that the enamel heats more quickly than the glass. In one particular embodiment, glass with a ceramic enamel border is preheated to a temperature above its strain point temperature. The coated glass is then exposed to a quartz heater to preferentially heat the enamel to a sufficiently high temperature to fire it onto the glass. The ceramic enamel is then allowed to cool down to the temperature of the remainder of the glass.

U.S. Pat. No. 5,443,669 B discloses a process for producing a laminated glass pane with single or double curvature, especially for a motor vehicle and, more particularly, for producing a glass pane having a printed pattern, especially for a motor vehicle windshield where that pattern can be a border. The printed pattern is formed using an enamel ink.

Unfortunately, such attempted solutions have been unsatisfactory and have disadvantages such as high extra costs and time to design, build, install and optimize tooling shields. Also, the general optical quality, in terms of glass shaping in other areas, may be negatively affected by the additionally introduced shields, because the shield affects the shaping of the remainder of the glass. Furthermore, the attempted solutions may lead to further cosmetic issues caused by the enamel ink of the obscuration band underfiring.

More successful attempted solutions to the burnline problem may involve modifying the properties of the enamel to increase spectral reflection at NIR (Near Infrared) and IR (Infrared) wavelength ranges (which may be equivalent to reducing the difference in emissivity between printed and non-printed glass surfaces, especially at medium and high temperatures) as discussed in WO-A-2017/068368.

Advanced Driver Assistance Systems (ADAS) systems (e.g. those produced by Mobileye and other manufacturers) are becoming more common in vehicles and may be used for lane departure warnings, autonomous emergency braking, high beam assist, speed limit identification and other applications. Many of these systems rely on one or more cameras, which are commonly mounted on the internal surface (i.e. surface 4) of the windscreen. A preferred position for mounting the camera(s) is towards the upper edge of the windscreen, generally in the centre, or symmetrically about the centreline of the windscreen, i.e. in the vicinity of the rear view mirror, which is usually positioned on the same part of the windscreen. The camera(s) are frequently positioned behind the obscuration band (when viewed from the exterior of the vehicle), and it is therefore necessary to provide an area which is free of the enamel, ink, etc. constituting the obscuration band, through which the camera (s) is/are able to view the area in front of the vehicle.

The area which is free of the obscuration band may for example take the form of an aperture or recess in the obscuration band, and is commonly referred to as a "camera window". Thus, for example, the camera window may, or may not, be enclosed by the obscuration band. The same considerations regarding providing a view forward also apply to sensors such as rain or light sensors which are positioned on surface 4 of the windscreen, often in the same part of the windscreen, so the term may be generalised to "sensor window".

Optical distortion deriving from the camera window may limit the effectiveness of the cameras and ADAS applications. US-A-2018/118116 discloses a vehicular camera system including a blackout layer disposed at an upper central region of a windshield. EP-A-1 605 729 discloses a vehicle windscreen fitted with an imaging device for viewing through a viewing area comprising resistance heating elements to heat the viewing area, and thereby alleviate the effects of ice or condensation on the view through the viewing area. DE 20 2018 105 625 U1 discloses a vehicle pane having two printed regions, wherein an optical effect of the first printed region can be compensated by an optical effect of the second printed region.

There is a need to further reduce optical distortion in laminated glazings, including for ADAS camera windows in or near obscuration bands printed on laminated glazings. This is especially so since the amount of optical distortion tolerated in ADAS camera windows is reducing with time as the demands placed on the performance of ADAS increase.

It is an aim of the present invention to address this need.

In a first aspect, the present invention accordingly provides a laminated glazing comprising a first glass ply having a first surface and a second surface, a second glass ply having a third surface and a fourth surface, at least one polymer ply located between the first and second glass plies, an obscuration band around at least a portion of the periphery of the glazing, the obscuration band having at least one sensor window and comprising a first obscuration layer and a second obscuration layer, the first glass ply having the first obscuration layer adhered to at least a portion of the periphery of the first surface or second surface, the first obscuration layer comprising at least one first sensor window portion having a first sensor window portion optical distortion, the second glass ply having the second obscuration layer adhered to at least a portion of the periphery of the third surface or fourth surface, the second obscuration layer comprising at least one second sensor window portion having a second sensor window portion optical distortion, wherein the first sensor window portion optical distortion and the second sensor window portion optical distortion are each controlled whereby the absolute magnitude of optical distortion of the sensor window is lower than the absolute magnitude of the first sensor window optical distortion and the second sensor window optical distortion.

This is greatly advantageous, because controlling the optical distortion of the sensor window portions ("sensor window portion optical distortion") on each ply allows the balancing of the overall optical distortion in the sensor window and thereby results is much reduced distortion through the sensor window of the laminated glazing thus allowing e.g. ADAS camera systems a clearer view.

In glazings, optical distortion is usually considered to be a characteristic of the image seen by the viewer (or by cameras and other optical sensors) which may result in a pixel shift. Optical power is usually considered to be a characteristic of the glazing (e.g. glass) that may result in the optical distortion. Optical power is generally measured in dioptres (equivalent to 1/m; the reciprocal value of the focal length of a lens P=1/f) or, more commonly, in millidioptres (mdpts: 1 mdpt=0.001 dioptre). In this specification, optical distortion and optical power are used interchangeably unless the context requires otherwise.

Surprisingly, the inventor of the present invention has discovered that generally, optical distortion of the sensor window portion in each ply is not always high, however when laminated to the other ply there may be a non-matched surface which may result in higher overall optical power and hence optical distortion. By balancing the two plies and in particular the sensor window portion optical distortion of each ply the present invention enables reduced overall optical power/distortion to be achieved. By balancing the sensor window portion optical distortion of each ply, the overall optical distortion is thereby reduced. The sensor window optical distortion in each of the plies is controlled so that they balance or compensate each other, yielding low net distortion. This has the effect of not only significantly reducing the overall magnitude of the optical distortion/power but also decreasing sharp changes in optical power/distortion across the glazing. In an idealised situation, the optical distortions in the two plies would be equal and opposite, so that they cancel each other out.

The present invention accordingly also provides a laminated glazing comprising a first glass ply having a first surface and a second surface, a second glass ply having a third surface and a fourth surface, at least one polymer interlayer ply extending between the first and second glass plies, an obscuration band around at least a portion of the periphery of the glazing, at least one sensor window provided in the obscuration band, the obscuration band comprising a first obscuration layer and a second obscuration layer provided on the first and second glass plies, the first glass ply having the first obscuration layer provided on at least a portion of the periphery of the first surface or second surface, the first obscuration layer comprising at least one first sensor window portion having an associated optical distortion, the second glass ply having the second obscuration layer provided on at least a portion of the periphery of the third surface or fourth surface, the second obscuration layer comprising at least one second sensor window portion having an associated optical distortion, wherein the first and second obscuration layers are formed of enamel, and wherein the configuration of the sensor window portions and at least one property of the enamel is selected so that the optical distortions associated with each of the sensor window portions compensate each other so as to yield reduced net optical distortion in the glazing.

Preferably, the selected property of the enamel is its infrared reflectance.

The first sensor window portion and second sensor window portion preferably have a sufficiently high light transmission in a region of the visible spectrum to enable ADAS cameras to view through the laminated glazing. At present, ADAS cameras and other sensors are generally fitted to windscreens, and most countries require windscreens to possess a visible light transmission of at least 70%. Leaving aside regulatory requirements, the visible light transmission (e.g. according to ISO 9050) is preferably above 55%, 60%, more preferably above 70% and most preferably above 75%. As ADAS cameras become more sensitive, and the minimum light transmission required for them to function satisfactorily decreases, it is possible that they will be fitted to other glazings, e.g. backlights (i.e. rear windows), and such glazings may have a visible light transmission of less than 20% (in the case of privacy glazing), or less than 30%, or less than 40%, or less than 50%.

Generally, the obscuration layers and therefore the obscuration band may be adapted to be substantially opaque to visible light, such that the ISO 9050 visible light transmission of the obscuration layers of the glazing is 1% or lower, preferably 0.5% or lower and more preferably 0.1% or lower.

The glass substrate for each glass ply may be unshaped (e.g. it may be flat glass) but is preferably a shaped glass substrate and may be of a thickness such as, for instance, 1 mm to 5 mm. Usually, the obscuration layers will be applied to a flat glass substrate which is subsequently shaped, e.g. to form an automotive windshield or windscreen.

The polymer ply may comprise PVB (usually of <1 mm thickness, e.g. 0.76 mm thickness). There may be two PVB plies (e.g. each of 0.3 to 0.4 mm thickness) sandwiching a further plastics ply if greater performance or functionality (e.g. solar control) is required. For instance, the further plastics ply may be of PET and may have a solar control coating (e.g. having at least one silver layer and two or more dielectric layers) to provide such solar control.

The obscuration layers may be coloured to provide sufficient obscuration and may preferably be very dark and more preferably substantially black in visible colour. Usually, the obscuration layers and therefore obscuration band will form a band around at least a part of the periphery of the glazing.

Usually, the first sensor window portion and the second sensor window portion are substantially free of enamel.

In one embodiment the shape of the first sensor window portion may be different to the shape of the second sensor window portion thereby controlling the first sensor window portion optical distortion and the second sensor window portion optical distortion.

Independently, therefore, the shape of the first sensor window portion and/or the second sensor window portion may be square, rectangular, trapezoid, elliptical, or circular.

Usually, the first sensor window portion and/or the second sensor window portion are partially or wholly surrounded by the first obscuration layer and/or second obscuration layer respectively. The first obscuration layer and/or second obscuration layer may be on one side, two sides, three sides or four sides of the first sensor window portion and/or the second sensor window portion.

In order to improve the control of the window portions' optical distortion, at least a portion of the periphery of the first sensor window portion or second sensor window portion may be patterned, optionally comprising dots, lines, a fade-out, a feathered edge, or a saw-tooth fade-out.

In another embodiment of the invention, the first obscuration layer and the second obscuration layer may be formed of materials having a different infrared reflectance, thereby allowing control of the first sensor window portion optical distortion and the second sensor window portion optical distortion.

For example, the first and/or second obscuration layer may have a relatively high infrared reflectance so that at least a portion of the first obscuration layer and/or of the second obscuration layer has an infra-red reflectance of 21% or higher over a region in the wavelength range 800 nm to 2250 nm. The infrared reflectance of the portion may be 24% or higher, preferably 27% or higher, more preferably 30% or higher, still more preferably 32% or higher, yet more preferably 35% or higher, most preferably 37% or higher over a region in the wavelength range 800 nm to 2250 nm. The region in the wavelength range 800 nm to 2250 nm may extend over 400 nm or greater, preferably 450 nm or greater, more preferably 550 nm or greater and most preferably 610 nm or greater.

Infrared reflectance may be measured over this wavelength range by using a Spectrophotometer (e.g. Perkin Elmer Lambda 9500).

An important characteristic is the difference in infrared reflectance between the first and second obscuration layers. This difference could result from one obscuration layer having a typical infrared reflectance, e.g. in the region of 17% to 20%, whereas the other obscuration layer might have a high infrared reflectance, e.g. 21% or higher, as set out above, or a low infrared reflectance, e.g. 16% or less. Alternatively, one obscuration layer may have a high infrared reflectance, whereas the other obscuration layer may have a low infrared reflectance. Preferably the difference in infrared reflectance between the first and second obscuration layers is at least 5%, 7%, 9%, 12%, 15%, 18% or 21%.

Generally, therefore, a high infrared reflectance obscuration layer may have an average infrared reflectance of 30 to 50% depending on the process conditions. Obscuration layers that do not specifically provide high IR reflectance may have IR reflectance of around 17% or lower or 20% or lower in the IR (800-2000 nm) whereas high reflectance enamels may have reflectance of 30% or higher across much of that range.

The second and/or first obscuration layer may have a relatively low infrared reflectance so that at least a portion of the first obscuration layer and/or of the second obscuration layer have an infra-red reflectance of 20% or 16% or lower over a region in the wavelength range 800 nm to 2250 nm.

The first obscuration layer and/or the second obscuration layer may comprise enamel. Usually, the enamel comprises a frit and an inorganic pigment. The inorganic pigment may be selected from a chromium-iron pigment, a ferrite pigment, a chromite pigment or a ferrite/chromite (also known as iron chromite) pigment.

The enamel may be adapted to provide suitable (e.g. high or low) emissivity properties by selecting an appropriate infrared and/or near IR reflective pigment and including the infrared reflective pigment in the enamel is a suitable amount. The enamel may comprise 10 wt % to 50 wt % inorganic pigment, preferably 10 wt % to 40 wt %, more preferably 12% to 32%. The enamel may comprise 20 wt % to 80 wt % frit.

The oxide frit may include particles of at least one compound selected from silica, titania, alumina, zirconia, compounds having fluoride ion (e.g., fluorite, fluorapatite, cryolite, etc.), bismuth oxide, zinc oxide, boron oxide, potassium oxide, sodium oxide, calcium oxide, barium oxide, lead oxide, lithium oxide, phosphorous oxide, molybdenum oxide, strontium oxide, and magnesium oxide.

A suitable inorganic pigment may comprise a pigment selected from a Fe/Cr pigment, a Co/Al pigment, a Co/Al/Cr pigment a Co/Ti pigment, a Co/Cr pigment, a Ni/Fe/Cr pigment, a Ti/Cr/Sb pigment, a Fe pigment, a Cr pigment and/or a mixture of two or more of these pigments.

Thus, the inorganic pigment may be selected from a chromium-iron pigment, a ferrite pigment, a chromite pigment or a ferrite/chromite (also known as iron chromite) pigment.

Depending on the nature of the design of the laminated glazing, the enamel on the first glass ply and the enamel on second glass ply may be independently selected from high infra-red reflectance enamel or low infra-red reflectance enamel.

The infrared reflectance of the first or second obscuration layer may be controlled by using suitable enamels of differing infrared reflectance or different emissivity.

Thus, the enamel of the first obscuration layer and/or the enamel of the second obscuration layer may be selected from low infrared reflectance enamel or high infrared reflectance enamel, thereby allowing control of the first sensor window portion optical distortion and the second sensor window portion optical distortion.

Thus, the infra-red reflectance of the high IR reflectance enamel may be 21% or higher over a region in the wavelength range 800 nm to 2250 nm. The infra-red reflectance may be 24% or higher, preferably 27% or higher, more preferably 30% or higher, still more preferably 32% or higher, yet more preferably 35% or higher, most preferably 37% or higher over a region in the wavelength range 800 nm to 2250 nm.

The region in the wavelength range 800 nm to 2250 nm may extend over 400 nm or greater, preferably 450 nm or greater, more preferably 550 nm or greater and most preferably 610 nm or greater.

Further control of optical distortion may be achieved if the periphery of either the first sensor window portion or second sensor window portion comprises an obscuration frame portion of lower (or higher) infrared reflectance than the obscuration layer on the rest of the ply and/or of lower (or higher) infrared reflectance than the obscuration layer on the other glass ply.

Thus, the periphery of the second sensor window portion may comprise the obscuration frame portion.

Use of ceramics/enamels in obscuration layers/bands is advantageous because it uses a known process and the enamels have proven durability and performance. Enamel/ceramic layers are likely to be useful at the glazing edge to protect the (e.g. adhesive) bond to the vehicle, so using ceramics avoid the need to colour match other methods applied to the sensor window. The present invention allows the reduction of optical distortion/power to close to that of a shaped glass without a ceramic layer thus providing great advantages since using obscuration layers formed of ceramics (i.e. enamels) are advantageous in themselves.

In another embodiment, the first and second sensor window portions may be different sizes, i.e. one of the two sensor window portions may be larger than the other. For instance, the first sensor window portion may be larger than the second window portion. In more detail, the first sensor window portion may have an x axis dimension and/or a y axis dimension and the second sensor window portion may have an x axis dimension and/or a y axis dimension, wherein the x axis dimension and/or the y axis dimension of the first sensor window portion is different to the x axis dimension and/or the y axis dimension respectively of the second sensor window portion, thereby allowing control of the first sensor window portion optical distortion and the second sensor window portion optical distortion.

The x axis dimension of the first sensor window portion may be greater than the x axis dimension of the second sensor window portion, and/or the y axis dimension of the first sensor window portion is greater than the y axis dimension of the second sensor window portion.

The smaller window portion may be located so that there is an offset at each end of the dimension relative to the larger window portion. Preferably, the smaller window portion is located so that there is an offset at each end of the dimension relative to the larger window portion. The offsets at each end of the dimension may be substantially the same or may differ.

The optical distortion of the first sensor window portion and/or the second sensor window portion appear to contribute to the optical power/distortion of the sensor window.

Thus, it is preferred that the first sensor window portion and/or the second sensor window portion have an optical distortion controlled to be in the range −405 to +405 millidioptres, optionally in the range −310 to +310 millidioptres. More preferably, the first sensor window portion and/or the second sensor window portion have optical distortion in the range −205 to +205 millidioptres, optionally in the range −185 to +185 millidioptres, preferably in the range in the range −155 to +155 millidioptres.

The present invention is greatly advantageous because control (and balancing) of the first sensor window portion optical distortion and the second sensor window portion optical distortion results in much improved sensor windows and in particular may result in the sensor window having an optical power/distortion in the ranges ±250 mdpt (i.e. the absolute magnitude of the optical distortion of the sensor window is 250 mdpt), ±245 mdpt, ±205 mdpt, ±200 mdpt, ±195 mdpt, ±190 mdpt, ±175 mdpt, ±165 mdpt, ±160 mdpt, ±157 mdpt, ±152 mdpt, ±147 mdpt, ±145 mdpt, ±142 mdpt, ±137 mdpt, ±132 mdpt, ±127 mdpt, ±122 mdpt, ±117 mdpt, ±112 mdpt, ±107 mdpt, ±102 mdpt, ±97 mdpt, ±92 mdpt, ±87 mdpt, ±82 mdpt, ±77 mdpt, ±72 mdpt, ±67 mdpt, ±65 mdpt, ±62 mdpt or ±60 mdpt.

The range of optical distortion/power may be wider or narrower and may depend on the inclination angle, window size, window design and bending process of the glazing.

In order to reduce condensation and or icing of the sensor window, an or each sensor window portion may comprise a heating device, optionally an electrical heating grid, e.g. comprising electrical resistance heating wires or other conductors.

It may be desirable for the laminated glazing to be used with two or more sensors or cameras. In some cases, therefore, the laminated glazing may comprise two or more sensor windows.

In a second aspect, the present invention provides an automotive windscreen comprising a laminated glazing according to the first aspect of the invention.

In a third aspect, the present invention provides a process for producing a shaped laminated glazing, the process comprising, providing a first glass substrate having a first surface and second surface and a second glass substrate having a third surface and a fourth surface, applying a first obscuration layer to at least a first portion of the first or second surface of the first glass substrate, the first obscuration layer comprising at least one first sensor window portion having a controlled first sensor window portion optical distortion, applying a second obscuration layer to at least a first portion of the third or fourth surface of the second glass substrate, the second obscuration layer comprising at least one second sensor window portion having a controlled second sensor window portion optical distortion, optionally, shaping the first glass substrate and the second glass substrate by heating the first glass substrate and the second glass substrate to a temperature above 570° C., placing at least one polymer ply between the first and second glass substrates, and laminating the first glass substrate, the polymer ply and the second glass substrate, whereby, by controlling the first sensor window portion optical distortion and the second sensor window portion optical distortion, the absolute magnitude of the optical distortion of the sensor window is lower than the absolute magnitude of the first sensor window optical distortion and the second sensor window optical distortion.

The invention is applicable to any of the shaping processes which are used for flat glass, whether for vehicles or for buildings. For instance, shaping may be carried out by press bending, i.e. pressing heat-softened glass sheets between opposed bending moulds, or sag (gravity) bending, i.e. allowing heat-softened glass sheets to deform under their own weight while supported on a sag bending mould, generally in a lehr furnace. Shaping may also be carried out by die-assisted sag bending, in which heat-softened glass sheets are sag bent, but parts of the sheets are also pressed by small pads or moulds.

It has been found that different shaping processes tend to yield differing optical powers in the glass plies. For instance, sag bending suffers from strong and concentrated burnline on surface 4, whereas the burnline developed on surface 2 tends to be of more moderate power and more diffuse, i.e. spread over a wider area. This tendency may be controlled by using infrared reflective inks on surface 4, thereby weakening the optical power developed on surface 4, and achieving the desired balance between surface 2 and surface 4. In this way, reduced net optical distortion is achieved.

Press bending, on the other hand, tends to produce a weak surface 4 burnline, whereas the surface 2 burnline is variable, appearing to depend more on the characteristics of the part being produced. If the surface 2 burnline is stronger than surface 4, then, somewhat counterintuitively, one might use an ink having lower infrared reflectance on surface 4 to actually increase the optical distortion on that surface. However, by better balancing the distortion on surface 2, one achieves lower net optical distortion. Alternatively, if the surface 2 burnline is weaker than surface 4, one might use a more reflective ink on surface 4, or a less reflective ink on surface 2, depending on the absolute magnitudes of the two distortions, and what inks are available.

Thus it is desirable to select the approach to reducing burnline to the shaping process in use, in particular the characteristics, such as infrared reflectance, of the inks being employed.

Applying the first obscuration layer and the second obscuration layer may comprise applying an enamel ink, the enamel ink comprising an inorganic pigment and a fit.

Other features of the third aspect are generally as described above in relation to the first aspect with appropriate modification.

The present invention will now be described by way of example only, and with reference to, the accompanying drawings, in which.

Figure 3A:
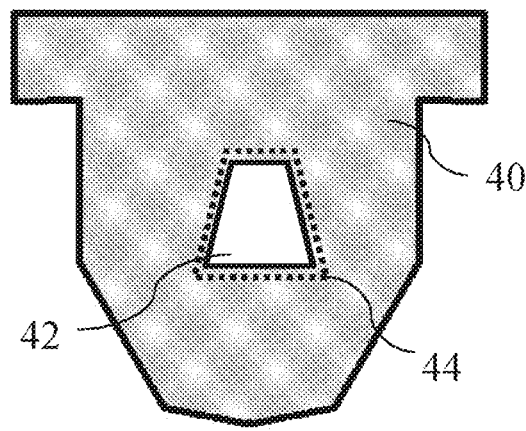
Figure 3B:
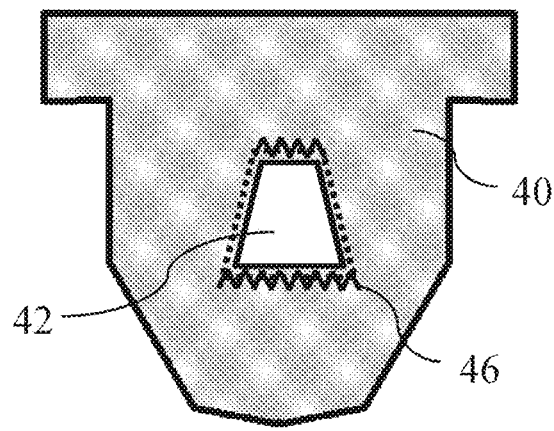
Figure 3C:
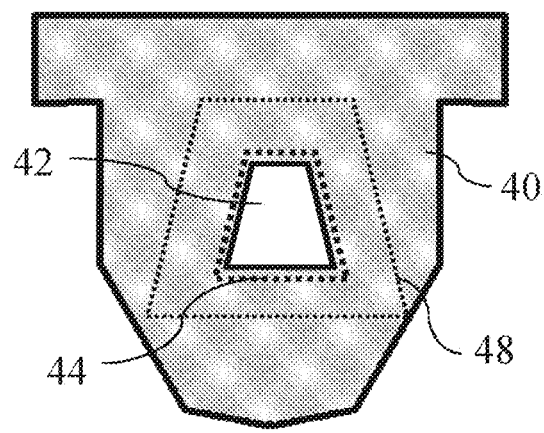

FIGS. 3(A)-3(C) show schematic views of sensor windows as used in the Examples: 3(A) the surface 4 second window portion is larger than the surface 2 first window portion, with offsets at top, bottom and sides; 3(B) the surface 4 second window portion is again larger (compared to surface 2, first window portion), with top and bottom fade-out and with offsets at top, bottom and sides; 3(C) larger surface 4 second window portion with offset all around (compared to surface 2 first window portion) and a high IR reflectance/low emissivity obscuration frame around surface 4 second window portion.

Figure 4:
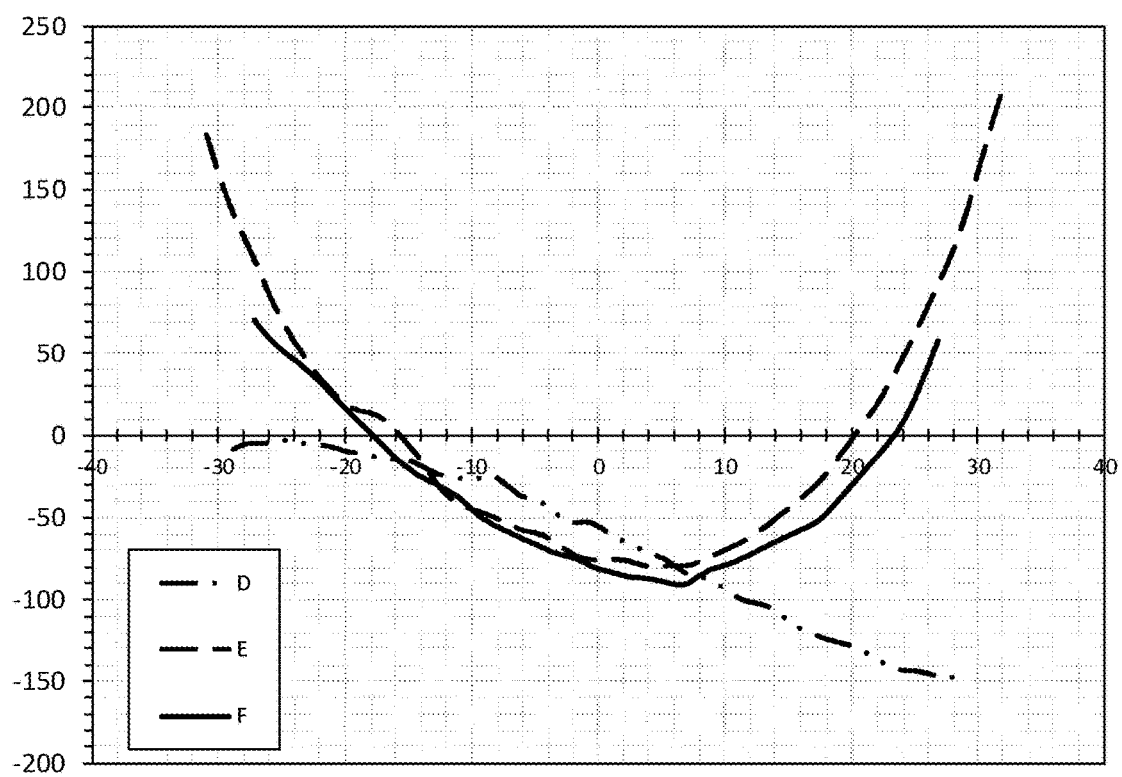

FIG. 4 is a graph of optical power against pixel position for Example 1.

Figure 5:
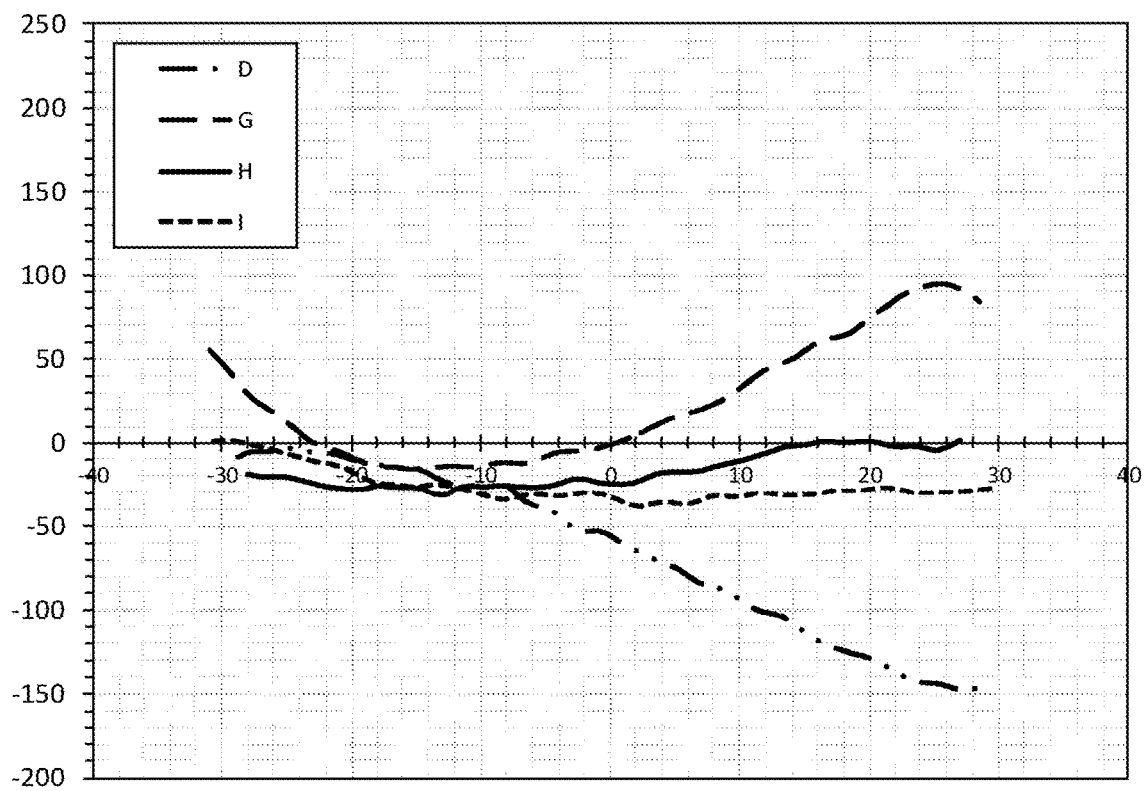

FIG. 5 is a graph of optical power against pixel position for Example 2.

Figure 6:
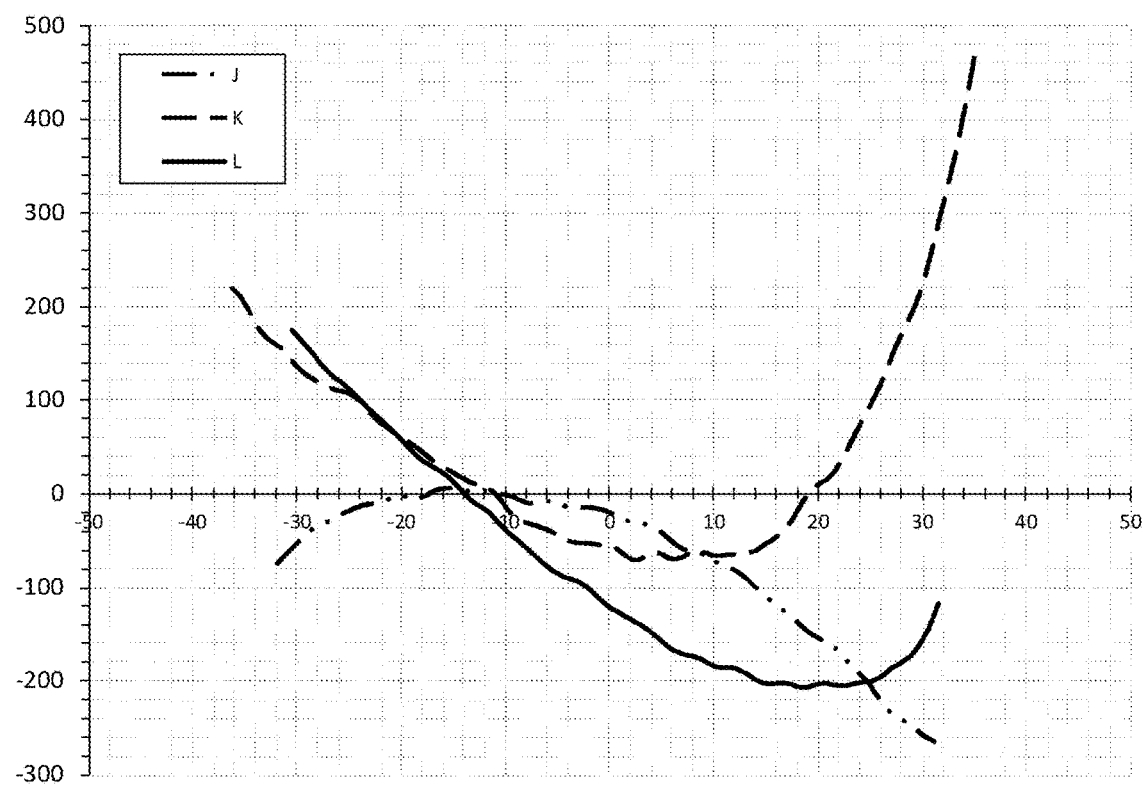

FIG. 6 is a graph of optical power against pixel position for Example 3.

Figure 7:
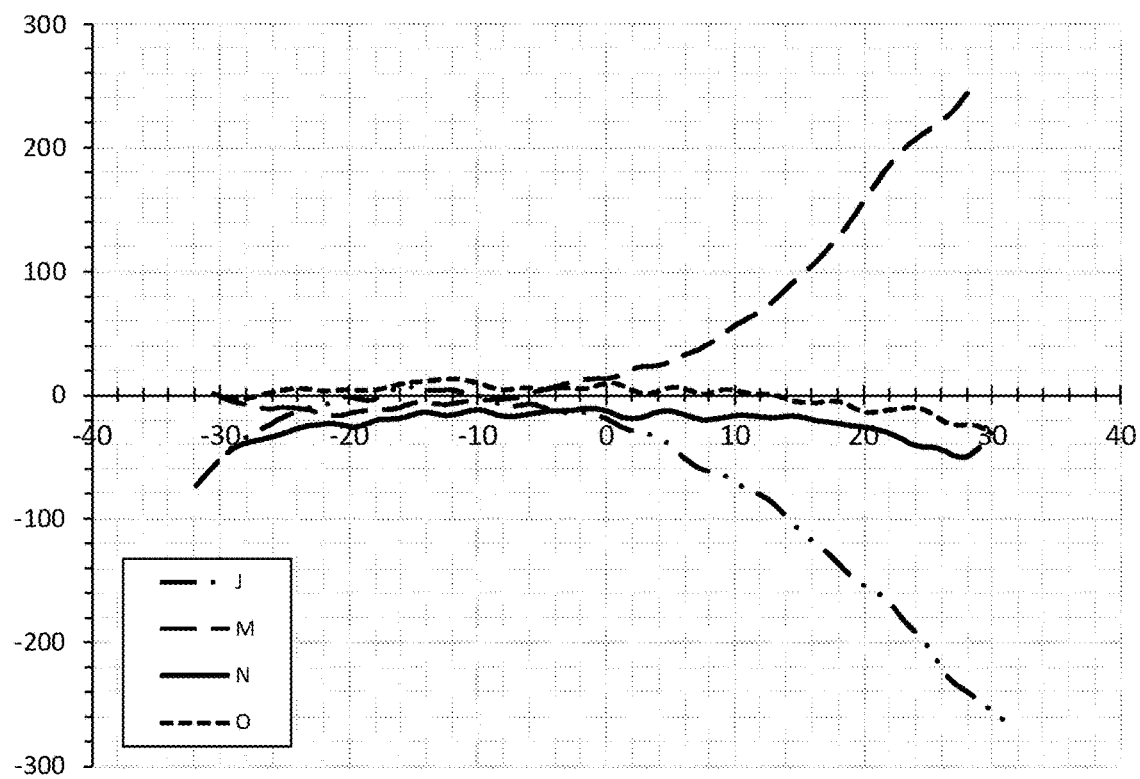

FIG. 7 is a graph of optical power against pixel position for Example 4.

Figure 8:
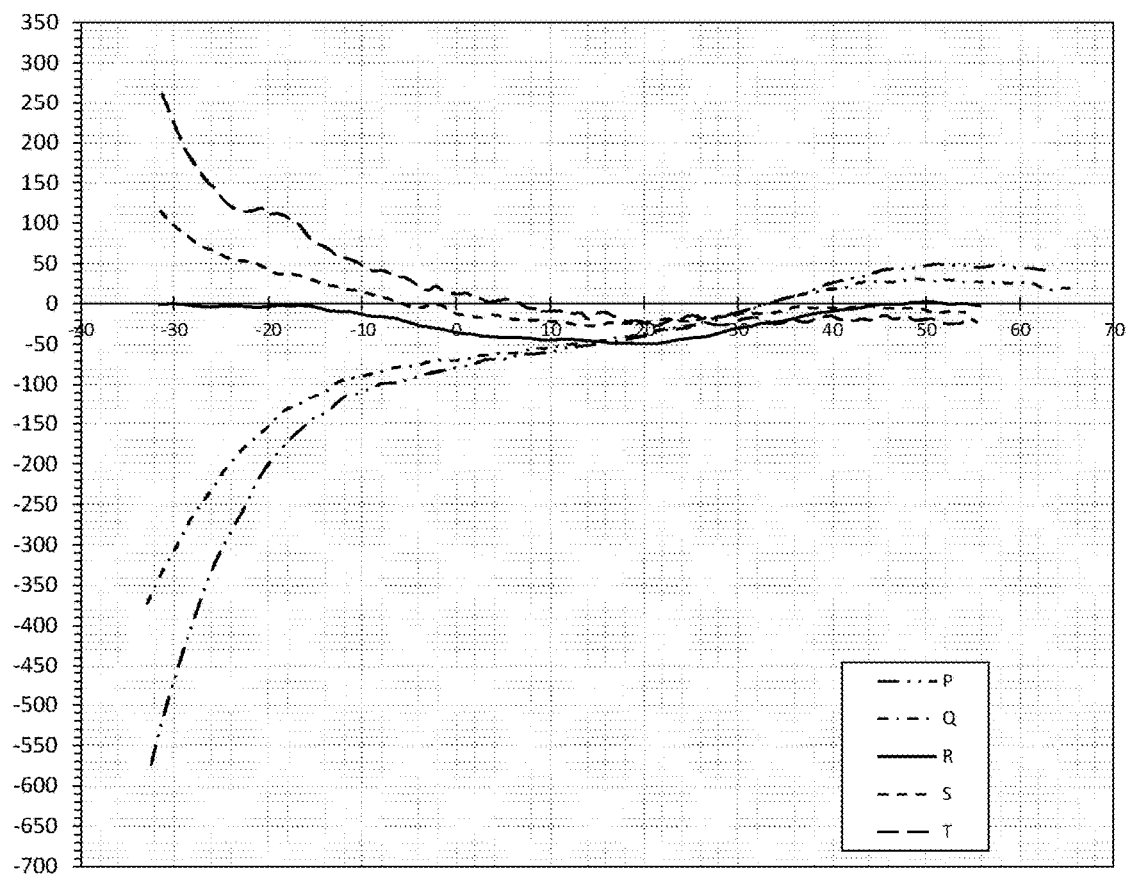

FIG. 8 is a graph of optical power against pixel position for Example 5.

FIGS. 9(A)-9(E) show alternative schematic views of sensor windows of various designs, illustrating the shape of the surface 2 (S2) first window portion and surface 4 (S4) second window portion.

Figure 1A:
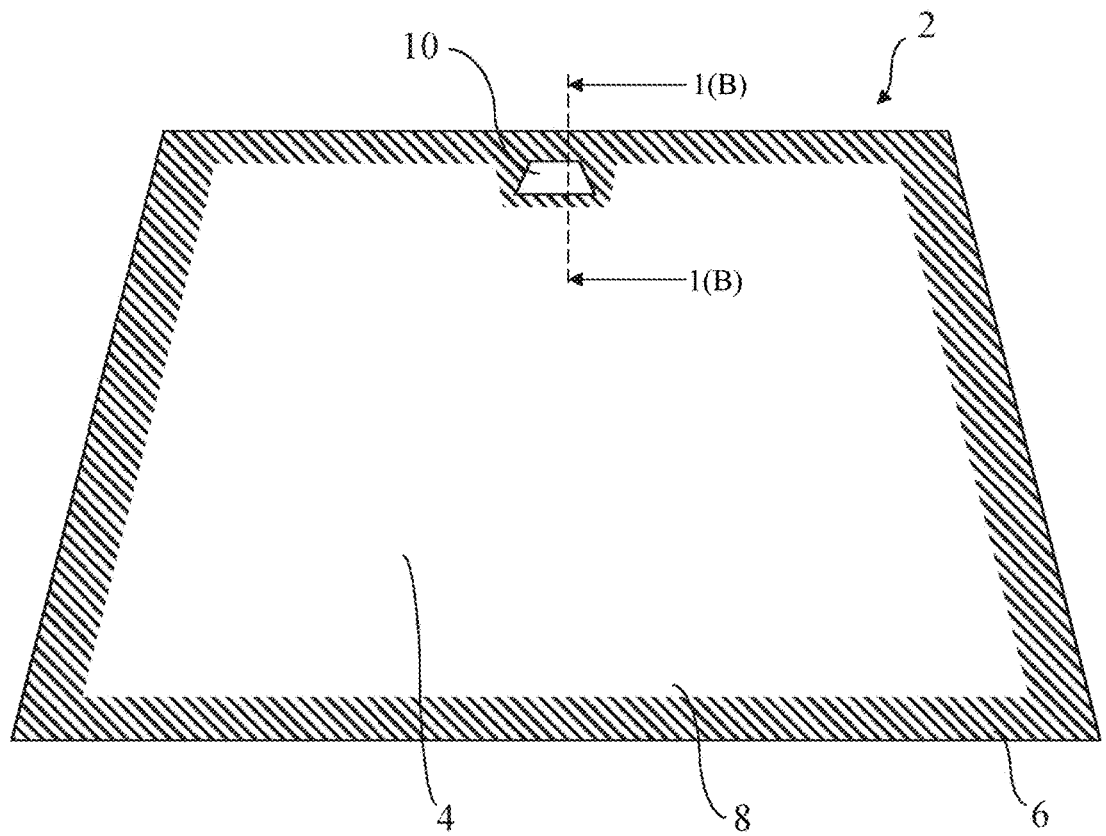
FIG. 1(A) is a schematic plan view of one embodiment of a laminated glazing according to the invention and FIG. 1(B) is a schematic cross-sectional view of part of the glazing of FIG. 1(A) on section line 1(B)-1(B).

FIG. 1(A) illustrates a laminated glazing 2 according to the invention. The laminated glazing 2 is a windshield for a motor vehicle. The laminated glazing 2 comprises two glass plies laminated together by an interlayer extending between the glass plies. The interlayer comprises a ply of polymeric plastics material, e.g. a ply of polyvinyl butyral (PVB). The laminated glazing 2 has a peripheral obscuration band 6 surrounding a transparent portion 4 of the glazing 2. The obscuration band 6 is optically opaque and conceals parts of the vehicle and also provides protection to adhesives from UV light.

In the obscuration band 6, on the upper edge of the windscreen (when installed in a vehicle), there is an optically transparent advanced driver assistance system (ADAS) camera sensor window 10, i.e. an area which is free from the enamel of the obscuration band 6. When installed in a vehicle, the ADAS camera sensor window 10 allows a camera to form an image viewed through the upper part of the windscreen.

When the glass plies are heated to the elevated temperature required for bending, differences are observed in the heating rate of the portions of the glazing provided with black obscuration band 6 compared with the transparent portions 4 of glazing 2 and transparent camera window 10. These differences in heating rate result in the development of local temperature differences in the glass, and these in turn cause viscosity differences in the heat-softened glass. It is believed that optical distortion may result from these differences. Optical distortion is found to occur after heating/shaping of the glass plies in parts of the glass plies at the periphery of the transparent portion 8, near the edge of the obscuration band 6, and in the sensor window 10. Heating/shaping of the glass plies may be conducted by methods of sag bending or press bending and as mentioned previously the degree and kind of optical distortion may differ between the methods. Optical distortion may also occur following cooling of printed glass plies, again this is believed to be due to temperature differences developing.

Figure 1B:
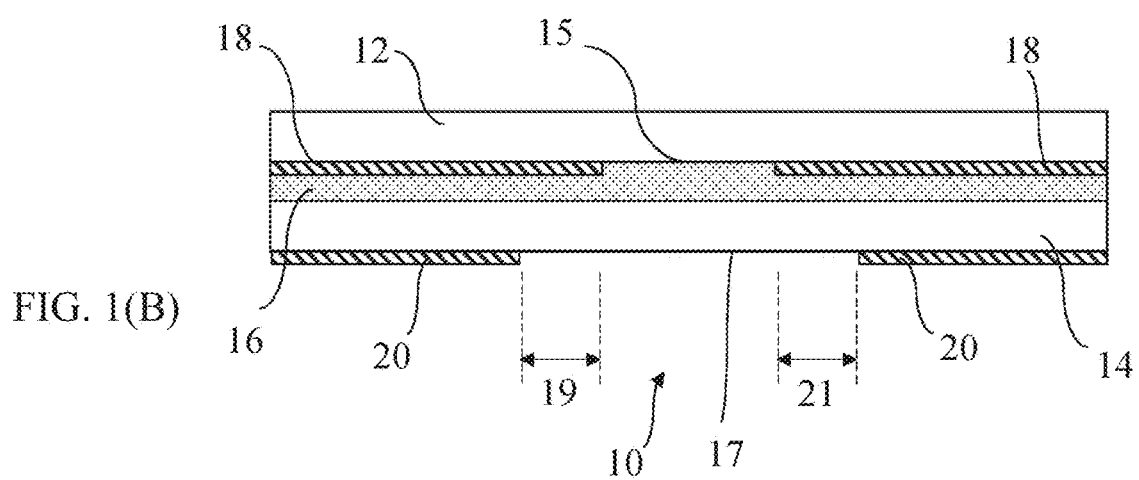

FIG. 1(B) shows a section on section line 1(B)-1(B) of FIG. 1(A). The laminated glazing 2 has an outer first glass ply 12 (which faces the exterior of the vehicle when installed), an inner second glass ply 14 and a polymer interlayer 16 of PVB (usually 0.76 mm thick). The obscuration band 6 shown in FIG. 1(A) comprises two obscuration layers, one on surface 2 and one on surface 4 of the glazing. The surface 2 obscuration layer 18 of black, opaque enamel is printed on surface 2 of the outer first glass ply 12 (i.e. the non-exposed surface of the first glass ply 12 that is inside the laminate, and faces the interior of the vehicle) with a non-printed, i.e. transparent, area forming the first sensor window portion 15. The surface 4 obscuration layer 20 of black, opaque enamel is printed on surface 4 of the second glass ply 14 (i.e. the surface of the inner glass ply 14 that faces the interior of the vehicle when installed), again with a non-printed area forming the second sensor window portion 17. The first sensor window portion 15 and second sensor window portion 17 together form the sensor window 10 (e.g. for the ADAS camera) in the laminated glazing 2.

The second sensor window portion 17 is, in the embodiment of FIGS. 1(A) and 1(B), larger than the first sensor window portion 15. This results in an offset 19 between the lower edges of the two sensor window portions and similarly an upper edge offset 21, the offsets 19, 21 being the difference in vertical (i.e. y-axis) dimension (once the glazing is installed, as illustrated in FIG. 1(A)) at the upper and lower edges of the outer 15 and inner window portions 17. The offsets 19, 21 are substantially the same in the embodiment of FIGS. 1(A) and 1(B) but may differ in other embodiments.

For the embodiment shown in FIGS. 1(A) and 1(B), both glass plies were shaped by sag bending and surprisingly, the larger inner window portion 17 tends to result in the optical distortion from surface 2 obscuration layer 18 and surface 4 obscuration layer 20 balancing each other, and reducing the overall or net optical distortion of the sensor window 10.

Figure 2:
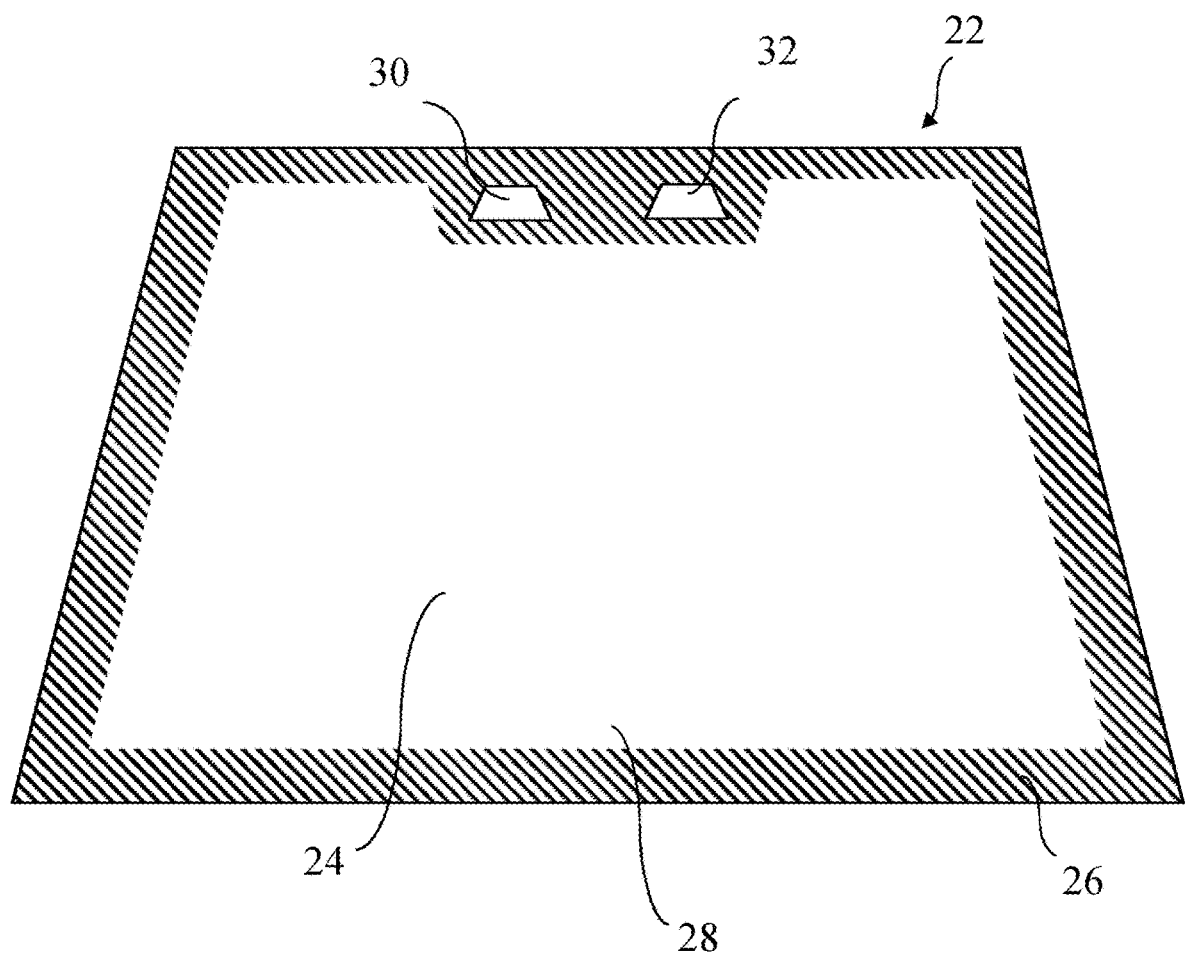
FIG. 2 is a schematic plan view of another embodiment of a laminated glazing according to the invention.

FIG. 2 illustrates a laminated glazing 22 according to another embodiment of the invention. The laminated glazing 22 is a windshield for a motor vehicle. The laminated glazing 22 comprises two glass plies laminated together by a polymer ply of interlayer, e.g. polyvinyl butyral (PVB). The laminated glazing 22 has a peripheral obscuration band 26 surrounding a transparent portion of the glazing 24. The obscuration band 26 is optically opaque and conceal parts of the vehicle and also to provide protection to adhesives from UV light.

In the obscuration band 26, on the upper edge of the windscreen (when installed in a vehicle), there are two optically transparent advanced driver assistance system (ADAS) camera sensor windows, comprising left sensor window 30 and right sensor window 32. The sensor windows are free from the enamel of the obscuration band 26. When installed in a vehicle, the sensor windows 30, 32 allow one or more cameras to form an image viewed through the upper part of the windscreen.

As in the embodiment of FIGS. 1(A) and 1(B), owing to differences in heating rate of the black obscuration band 26 and the transparent portions of glazing 24 and transparent camera windows 30, 32 optical distortion may occur after heating/shaping of the glass plies in parts of the glass plies at the periphery of the transparent portion 28, near the edge of the obscuration band 26, and in the sensor windows 30, 32. Heating/shaping of the glass plies may be conducted by methods of sag bending or press bending and the degree and kind of optical distortion may differ between the methods.

The obscuration bands in both embodiments comprise an enamel formed by screen printing an enamel ink on the surface, curing/drying and then firing the ink. The enamel may comprise a borosilicate glass frit and at least one inorganic pigment (e.g. containing iron and/or chromium FIGS. 3(A)-3(C) show schematic views of camera/sensor windows as used in the Examples. In each of FIGS. 3(A), 3(B) and 3(C), an obscuration band 40 has a sensor window 42. In FIG. 3(A) a larger surface 4 second sensor window portion 44 than surface 2 first sensor window portion has an offset at top, and sides of 5 mm (i.e. the surface 4 sensor window portion is larger at the top and sides than the surface 2 sensor window portion by 5 mm) and an 8 mm offset at the bottom. In FIG. 3(B) a larger surface 4 second sensor window portion with offsets as in FIG. 3(A) also has a saw-tooth fade-out 46 at the bottom and top of the window portion. The saw-tooth fade-out 46 is added to the top and bottom edges (rather than subtracted from them) so that the black print may extend a little further towards the sensor window centre than for the arrangement in FIG. 3(B). Other patterns may be employed instead of a saw-tooth pattern, e.g. dots, lines or a feathered edge. In FIG. 3(C), a larger surface 4 second sensor window portion 44 with an offset all-around of 5 mm is situated in a surface 4 obscuration frame 48 within the obscuration band 40, the obscuration frame 48 comprising high infrared reflectance enamel (of higher IR reflectance than the IR reflectance of the rest of the obscuration band on surface 4 and of the IR reflectance of the enamel on surface 2).

Numerous variants of these camera/sensor window configurations are possible. For instance, the surface 4 sensor window portion may be smaller than the surface 2 sensor window portion. Furthermore, the offsets need not be symmetrical, and may be displaced, i.e. with different offsets top to bottom or side to side or both.

FIGS. 9(A)-9(E) illustrate some other designs of sensor window portion showing the surface 2 (S2) (i.e. first sensor window portion) and surface 4 (S4) (i.e. second sensor window portion) designs. FIG. 9(A) is generally as shown in FIG. 3(A), FIG. 9(B) shows a one-sided S4 sensor window portion, having a single, lower bar on S4, FIGS. 9(C) and 9(E) show 3 sided "hat" or "U" configurations on S4, and FIG. 9(D) shows multiple bars/blocks on S4.

A laminated glazing as illustrated in FIGS. 1(A) and 1(B) or FIG. 2 may be made generally as follows. A flat glass substrate (e.g. 2.1 mm thick soda lime float glass) is subjected to screen printing (using a screen that may have e.g. 50 to 120 threads/cm polyester screen for example 77 or 100 threads/cm polyester screen) by a silk-screen and doctor blade with an enamel ink to form a screen-printed border which is optionally dried by subjecting this substrate to infrared radiation from an infrared heater at a temperature below 300° C. Two printed glass substrates to form the outer first glass ply 12 and inner second glass ply 14 are then stacked and the stacked substrates are subjected to bending. In this stage, a source of heat is provided and bending can be effected, usually by heating over 8 minutes to a temperature of 570° C., held at this temperature for a period of one minute and then bent at this temperature in any standard bending mould or frame by press or sag bending, The substrates are separated and then, after cooling, are laminated together using a PVB interlayer (about 0.76 mm thick).

The glazing may be laminated by methods involving, for example, first a pre-nip by a nip roller or using a vacuum ring applied to the edges of the first and second plies of glass to de-gas the assembly of glass plies and PVB interlayer. The first and second glass plies and the PVB interlayer are then laminated together in an autoclave in the pressure range 6 bar to 14 bar and in the temperature range 110° C. to 150° C.

The invention is further illustrated, but not limited, by the following Examples.

EXAMPLES

In the Examples, laminated windows were manufactured in accordance with the method described above using black enamel (e.g. Johnson Matthey 1L530, Prince DV174100 and Prince DV17450, a high IR reflectance enamel) and using varying sizes and shapes of sensor window portions on surface 2 and 4 as illustrated in FIGS. 3(A)-3(C). A further ink which has been tested is Johnson Matthey 1L4755-WF789P, which is an ink of intermediate performance.

The optical power of a number of samples of each laminated glazing horizontally and vertically were measured at an angle of 55° (converted to a test angle of 60° for comparison) using an optical power measurement system equivalent to ISRA Vision AG standard systems with filters to define the optical power integration length (e.g. 1/2/0 ISRA filters, equivalent to 1 mm/1 mm filters in the optical power measurement system).

Light transmission in the visible spectrum 380-780 nm was at least 54% measured at installation angle.

The average vertical optical power along the centreline of each window was determined proceeding from top to bottom, and the results are shown in the graphs of FIGS. 4 to 8. The x-axis shows the measurement position in mm relative to the window centre, so that the top of the window is on the left-hand side (x=negative) and the bottom of the window is on the right-hand side (x=positive). The y-axis shows the optical power in mdpt measured at each position, but converted to 60° as mentioned above.

Example 1

This Example employs inks that generate standard levels of optical power. The results are shown in FIG. 4 with standard sensor window portions on surface 2 and surface 4. There is a relative S2/S4 offset of 5 mm all round and 8 mm at the bottom (with S4 window portion being larger). Line D shows the optical power developed on surface 2, which is negative, and line E shows the optical power generated on surface 4, which is also negative in the centre of the window, but positive towards the top and bottom. Line F shows the net optical power, which is reduced in terms of its absolute magnitude towards the top, and especially the bottom, of the window, but little improved in the centre. FIG. 4 shows how balancing opposed optical powers on printed surfaces adjacent the obscuration layers can provide reduced optical distortion relative to the individual plies. However, since the optical power developed on surface 2 is rather weaker than that on surface 4, an optimum result is not yet achieved.

Example 2

In this Example, an enamel with high infrared reflectance is employed on surface 4, and the results are shown in FIG. 5. The design of windscreen and the sensor window portions is the same as for Example 1 but with offset at 5 mm all round (S4 was ~5 mm larger all round than S2). As mentioned, the obscuration layer on surface 4 uses a high IR reflectance enamel (the enamel on surface 2 is a standard enamel as in Example 1). Line D is as in Example 1. Line G shows the optical power produced on surface 4 by the enamel having high infrared reflectance. Line H shows the net optical power in the window; this line lies close to the x axis, showing how much the optical distortion has been reduced. By selecting the high infrared reflectance ink for surface 4, a distortion profile has been produced which is much closer to the opposite of surface 2 (line D) than is the case in Example 1. Consequently, the optical distortion of the combined system is further much reduced. For comparison, line I shows the optical power in unprinted glass by way of a baseline. It can be seen that towards the bottom of the window the net optical power is actually better than unprinted glass, and towards the top it is close to that of unprinted glass.

Example 3

This Example employs a different windscreen to Examples 1 and 2. Standard inks were used, as in Example 1, and the results are shown in FIG. 6. The design of the sensor window portions is the same as for Example 1 offset by 5 mm all round and 8 mm at the bottom. Line J shows the optical power generated on surface 2, and line K shows the optical power generated on surface 4. Line L shows the combined optical power. Although a different design of windscreen was used, the results show similar effects to Example 1. Since the optical power on surface 4 (line K) is of greater absolute magnitude than that on surface 2 (line J), the compensation effect is only partially achieved, namely towards the bottom of the windscreen.

Example 4

This Example employs the windscreen of Example 3, and uses a high infrared reflectance enamel on surface 4. The results are shown in FIG. 7. The design of the windscreen and sensor window portions is the same as for Example 3 but with offset at 5 mm all round (S4 was ~5 mm bigger all round than S2) and the obscuration layer on surface 4 uses a high IR reflectance enamel. Line J is as in Example 3, and line M shows the optical power achieved on surface 4 using the high IR reflectance enamel. Note how line M is almost a mirror image of line J, taking the x axis as the mirror. The net optical power is shown by line N, and is much reduced. Once again, this shows that if the design of the sensor window portion and the ink employed are selected appropriately, equal and opposite optical powers may be achieved in the individual plies, which virtually cancel each other out following lamination. Line O again shows for comparison the baseline optical power in unprinted glass. The optical distortion is much reduced and is close to that of unprinted glass.

Example 5

This Example illustrates a number of approaches to balancing optical distortion/power and combinations of sensor window portion designs and enamels. The results are shown in FIG. 8. The design of the windscreen and sensor window portions used a S4 "hat" around the 3 sides of the window portion (as in FIG. 9(C)), but (as in other Examples) around all four sides for S2, with an offset of 2-3 mm (S4 was ~5 mm bigger all round than S2). The sensor window design was generally as in FIG. 9(C). Line P shows optical power on surface 2 using standard enamel, line Q shows optical power on surface 2 using enamel of high infrared reflectance, and line T shows optical power on surface 4, again with enamel of high infrared reflectance. Windscreens were manufactured using two different configurations: first, with the surface 4 sensor window portion larger than the surface 2 sensor window portion (line R), and second, with the surface 2 sensor window portion larger than the surface 4 sensor window portion (line S). In both cases, the enamels were of high infrared reflectance. It can be seen that both lines R and S represent an improvement over the individual plies (lines Q and T), but line R yields the best result overall.

In summary, the present invention shows that balancing optical power profiles of a first and second glass ply provides sensor windows with significantly reduced overall optical distortion and power.

REFERENCE NUMERALS 2 laminated glazing
4 transparent portion of glazing
6 obscuration band
8 periphery of transparent portion
10 sensor (e.g. ADAS camera) window 12 first (e.g. outer) glass ply
14 second (e.g. inner) glass ply
15 first sensor window portion
16 polymer interlayer
17 second sensor window portion
18 surface 2 obscuration layer
19 lower edge offset
20 surface 4 obscuration layer
21 upper edge offset
22 laminated glazing
24 transparent portion of glazing
26 obscuration band
28 periphery of transparent portion
30 left sensor (e.g. ADAS camera) window
32 right sensor (e.g. ADAS camera) window
40 obscuration band
42 sensor window
44 surface 4 window portion offset
46 saw tooth fade out
48 obscuration frame (e.g. high IR reflectance)

The invention claimed is:

1. A laminated glazing comprising
a first glass ply having a first surface and a second surface,
a second glass ply having a third surface and a fourth surface,
at least one polymer ply located between the first and second glass plies,
an obscuration band around at least a portion of the periphery of the glazing, the obscuration band having a sensor window and comprising a first obscuration layer and a second obscuration layer,
the first glass ply having the first obscuration layer adhered to at least a portion of the periphery of the first surface or second surface, the first obscuration layer comprising a first sensor window portion for the sensor window having a first sensor window portion optical distortion,
the second glass ply having the second obscuration layer adhered to at least a portion of the periphery of the third surface or fourth surface, the second obscuration layer comprising a second sensor window portion for the sensor window having a second sensor window portion optical distortion,
wherein the first sensor window portion optical distortion and the second sensor window portion optical distortion are each controlled whereby the absolute magnitude of the optical distortion of the sensor window is lower than the absolute magnitude of the first sensor window optical distortion and the second sensor window optical distortion,
and wherein the first obscuration layer and the second obscuration layer are formed of materials having a different emissivity or infrared reflectance, thereby allowing control of the first sensor window portion optical distortion and the second sensor window portion optical distortion.

2. A laminated glazing as claimed in claim 1, wherein the shape of the first sensor window portion is different to the shape of the second sensor window portion thereby controlling the first sensor window portion optical distortion and the second sensor window portion optical distortion.

3. A laminated glazing as claimed in claim 1, wherein the shape of the first sensor window portion and/or the second sensor window portion is square, rectangular, trapezoid, elliptical, or circular.

4. A laminated glazing as claimed in claim 1, wherein the first sensor window portion and/or the second sensor window portion are partially or wholly surrounded by the first obscuration layer and/or second obscuration layer respectively.

5. A laminated glazing as claimed in claim 1, wherein at least a portion of the periphery of the first sensor window portion or second sensor window portion is patterned.

6. A laminated glazing as claimed in claim 1, wherein at least a portion of the first obscuration layer and/or of the second obscuration layer have an infra-red reflectance of 21% or higher over a region in the wavelength range 800 nm to 2250 nm.

7. A laminated glazing as claimed in claim 1, wherein the first obscuration layer and/or the second obscuration layer comprise enamel, the enamel comprising a frit and an inorganic pigment, and wherein the inorganic pigment is selected from a chromium-iron pigment, a ferrite pigment, a chromite pigment or a ferrite/chromite (also known as iron chromite) pigment.

8. A laminated glazing as claimed in claim 7, wherein the enamel of the first obscuration layer and/or the enamel of the second obscuration layer are selected from low emissivity or low IR reflectance enamel or high emissivity or high IR reflectance enamel, thereby allowing control of the first sensor window portion optical distortion and the second sensor window portion optical distortion.

9. A laminated glazing as claimed in claim 1, wherein the periphery of either the first sensor window portion or the second sensor window portion comprises an obscuration frame portion of different IR reflectance than the obscuration layer on the rest of the ply and/or of different IR reflectance than the obscuration layer on the other glass ply.

10. A laminated glazing as claimed in claim 9, wherein the periphery of the second sensor window portion comprises the obscuration frame portion.

11. A laminated glazing as claimed in claim 1, wherein the first sensor window portion has an x axis dimension and/or a y axis dimension and the second sensor window portion has an x axis dimension and/or a y axis dimension, wherein the x axis dimension and/or the y axis dimension of the first sensor window portion is different to the x axis dimension and/or the y axis dimension respectively of the second sensor window portion, thereby allowing control of the first sensor window portion optical distortion and the second sensor window portion optical distortion.

12. A laminated glazing as claimed in claim 11, wherein the x axis dimension of the first sensor window portion is greater than the x axis dimension of the second sensor window portion, and/or the y axis dimension of the first sensor window portion is greater than the y axis dimension of the second sensor window portion.

13. A laminated glazing as claimed in claim 12, wherein the smaller window portion is located so that there is an offset at each end of the dimension relative to the larger window portion.

14. A laminated glazing as claimed in claim 1, wherein the first sensor window portion and/or the second sensor window portion have an optical distortion in the range −405 to +405 millidioptres.

15. A laminated glazing as claimed in claim 1, wherein the sensor window has an optical distortion in the range −195 to +195 millidioptres.

16. A process for producing a shaped laminated glazing having an obscuration band around at least a portion of the periphery of the glazing, the obscuration band having a sensor window, the process comprising, providing a first glass substrate having a first surface and second surface and a second glass substrate having a third surface and a fourth surface, applying a first obscuration layer to at least a first portion of the first or second surface of the first glass substrate, the first obscuration layer comprising a first sensor window portion for the sensor window having a controlled first sensor window portion optical distortion, applying a second obscuration layer to at least a first portion of the third or fourth surface of the second glass substrate, the second obscuration layer comprising a second sensor window portion for the sensor window having a controlled second sensor window portion optical distortion, optionally, shaping the first glass substrate and the second glass substrate by heating the first glass substrate and the second glass substrate to a temperature above 570° C., placing at least one polymer ply between the first and second glass substrates, and laminating the first glass substrate, the polymer ply and the second glass substrate, whereby, by controlling the first sensor window portion optical distortion and the second sensor window portion optical distortion, the absolute magnitude of the optical distortion of the sensor window is lower than the absolute magnitude of the first sensor window optical distortion and the second sensor window optical distortion, wherein the first obscuration layer and the second obscuration layer are formed of materials having a different emissivity or infrared reflectance, thereby allowing control of the first sensor window portion optical distortion and the second window portion optical distortion.

17. A laminated glazing as claimed in claim 1, wherein at least a portion of the periphery of the first sensor window portion or second sensor window portion is patterned, comprising dots, lines, a fade-out, a feathered edge, or a saw-tooth fade-out.

18. A laminated glazing as claimed in claim 1, wherein the first sensor window portion and/or the second sensor window portion have an optical distortion in the range −155 to +155 millidioptres.

19. A laminated glazing as claimed in claim 1, wherein the sensor window has an optical distortion in the range −145 to +145 millidioptres.

* * * * *